May 2, 1967  C. P. FORTNER ET AL  3,317,339
SURFACE MODIFICATION OF PLASTIC ARTICLES
Filed Dec. 23, 1963

FIG. I

```
RELATIVELY NON POLAR
   SYNTHETIC VINYL
   PLASTIC ARTICLE
          │
          ▼
┌─────────────────────────────┐
│   OXIDIZING THE SURFACE     │
│          OF THE             │
│   VINYL PLASTIC ARTICLE     │
└─────────────────────────────┘
          │
          ▼
┌─────────────────────────────┐
│ CONTACTING THE OXIDIZED     │
│ SURFACE WITH A NITROGEN     │
│ COMPOUND SELECTED FROM THE  │
│ GROUP CONSISTING OF         │
│ AMMONIA, HYDRAZINE,         │
│ AMINES HAVING THE FORMULA   │
│                             │
│            R                │
│            │                │
│          R–NH               │
│                             │
│       AND HYDRAZINES        │
│       HAVING THE FORMULA    │
│                             │
│          R   R              │
│          │   │              │
│        R–N–N–R              │
│                             │
│   THE R's IN THE FORMULA    │
│  REPRESENTING ALKYL RADICALS│
│  CONTAINING FROM ONE TO EIGHT│
│        CARBON ATOMS         │
└─────────────────────────────┘
```

INVENTOR.
CECIL P. FORTNER
BY James C. Logomasini
ATTORNEY:

United States Patent Office 3,317,339
Patented May 2, 1967

3,317,339
SURFACE MODIFICATION OF PLASTIC ARTICLES
Cecil Paul Fortner, Bloomfield, and Jules Pinsky, West Hartford, Conn., assignors to Monsanto Company, a corporation of Delaware
Filed Dec. 23, 1963, Ser. No. 332,877
10 Claims. (Cl. 117—47)

This invention relates to an improvement in the surface properties of synthetic resin articles. More particularly this invention relates to a treatment for making articles such as molded objects or sheets of polyethylene, polypropylene, polystyrene, vinyl resin or the like more receptive to ink or other coatings while also making them less apt to accumulate an electrostatic charge.

It is well known that articles made of relatively nonpolar synthetic resins such as polyolefins build up an electrostatic charge because of their low dielectric constant. This annoying phenomenon causes attraction of dust and dirt particles to the electrically charged polyolefin surface and, for instance, in the case of packaging film or plastic bottles seriously reduces their sales appeal. Indeed, in some critical uses the accumulation of even a relatively slight electrostatic charge can represent an intolerable explosion hazard or, as in the case of highfidelity phonograph records, a serious impairment of utility. Another significant disadvantage of polyethylene and similar materials is that their surfaces normally have a very low degree of receptivity for printing ink or for decorative or other coatings.

Heretofore it has been the practice to overcome one or both of these disadvantages by appropriate special treatments. Thus, it has been known to increase the low dielectric constant of such surfaces by applying thereto solutions of various special chemical agents. It has likewise been known to improve the adhesion of ink and the like to polyolefin surfaces by treating the surface by flame, electrostatic corona discharge or by treatment with liquid chemicals such as hot chromic acid, mixtures of sulfuric acid and potassium dichromate and so on. While these treatments have been reasonably effective, each of them represents a separate operation which adds significantly to the total production cost. These cost elements become particularly important if both surface adhesion and dielectric properties require improvement.

It is an object of this invention to provide an improved treatment for making the surfaces of synthetic resin articles less apt to accumulate an electrostatic charge as well as more receptive to ink and coating compositions.

Another object is to provide a simplified process for making polyolefin surfaces more adherent and more electrically conductive without requiring the use of costly, wet chemical treatments. These and other objects as well as the nature, scope and operation of the invention will become more clearly apparent from the following description and appended claims.

It has now been surprisingly discovered that a single operation can be effectively used to make the surface of a plastic article such as polyethylene bottle, a polystyrene film or a PVC phonograph record both receptive to coatings and less apt to accumulate dust and dirt. More particularly it has been discovered that polyolefin surfaces can be made antistatic while they are being treated to improve surface adhesion, provided that certain conditions are observed. Still more particularly it has been discovered that excellent antistatic properties can be imparted to a resinous polyolefin surface by appropriately combining conventional flame treatment, explosion treatment or corona discharge treatment with a chemical reaction whereby antistatic chemical groups are attached to the freshly treated surface.

Flame treatment of polyethylene, of either low or high density, and of similar polyolefin resins such as polypropylene and polystyrene, is well known. It has been practiced for many years to improve the receptivity of such resins for printing ink or other decorative or protective coatings such as those based on epoxy resins, vinylidene chloride copolymers, nylon, etc. Such flame treatment, which usually employs a neutral or slightly reducing flame, oxidizes or otherwise desirably modifies the hydrophobic nature of the polyolefin surface. For instance, suitable methods and apparatus for the flame treatment of thin polyethylene film are described in the Loukomsky Patent 2,767,103 and the Grow et al. Patent 2,795,820. Similar treatments can of course likewise be applied to the surface of polyolefin or polyvinyl chloride bottles or similar containers, phonograph records made of polyvinyl chloride (PVC) or of polystyrene, etc. Indeed, the treatment of such relatively heavy gauge articles is easier to carry out as much more latitude in time and severity of exposure is permissible than in treating a thin gauge film.

In the case of bottles satisfactory surface flame treatment can be obtained simply by dropping them through a conventional ring burner or through a zone around which are arranged an appropriate number of individual burners. Propane or butane or mixtures thereof, town gas and even liquid hydrocarbons such as kerosene, as well as oxygenated organic compounds such as isopropanol or other alkanols, represent suitable fuels that can be conveniently mixed with air or oxygen to produce a neutral or reducing flame as mentioned before. Where longer flame residence times are desired, the articles to be treated can be passed through the flame zone by sliding down an appropriately inclined chute or by conveying them on a mechanically driven conveyor, instead of allowing them to fall freely through the flame.

Instead of using flame treatment it is similarly possible to condition the plastic surface by exposing it to an explosive mixture of a fuel gas such as propane and air or oxygen and igniting the mixture. Such explosion treatment is described, for instance, in the Gardner et al. Patent 2,892,733 and in the Wilkalis Patent 2,952,560. While this treatment is particularly useful for treating the inner surfaces of plastic bottles or similar containers it can also be used for treating external surfaces if the article to be treated is placed in a suitable explosion chamber provided with appropriate nozzle means for feeding the explosive gas mixture and appropriate ignition means for exploding the gas mixture present. In still other methods polyolefin surfaces are conditioned by subjecting them to an electrostatic discharge such as a high voltage corona discharge as described, for instance, in the Traver Patent 3,018,189.

As far as the present invention is concerned, all of the aforementioned surface treating techniques possess the common characteristic that they produce a decaying type of reactive sites such as free radicals in the treated surface. The present invention is based on the discovery that effective antistatic properties can be imparted to polyolefin surfaces by combining the conventional flame treatment or other surface treating step with a chemical step wherein the reactive sites are reacted with a suitable auxiliary chemical which serves to make the surface of the plastic polar, thereby causing rapid dissipation of any electrostatic charge that may accumulate on such a surface.

Chemical agents particularly useful for effecting a substantial increase in the dielectric constant of the plastic surface are compounds rich in nitrogen, especially ammonia and its derivatives such as amines having the formula

or hydrazines having the formula

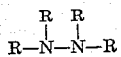

wherein the R's are selected from the group consisting of hydrogen and alkyl radicals of 1 to about 14, preferably 1 to 8 carbon atoms. The several R's on any given compound may be the same or they may be different, compounds having a total of not more than about 8 carbon atoms being preferred.

Suitable compounds thus include not only ammonia, but also amines such as methyl amine, n-butyl amine, diethyl amine, methyl hexyl amine, hydrazine, tetraethyl hydrazine, n-octyl hydrazine, etc. Generally speaking, any compound capable of resulting in the attachment of an amine end group to the plastic surface being treated should be useful in carrying out the present invention.

The chemical treatment of this invention can be effected either by following the conventional surface treatment promptly with a separate step wherein the treated surface is contacted with the desired chemical before the reactive centers generated in the first surface treatment have had a chance to decay or, preferably, an appropriate chemical agent is introduced directly into the principal surface treating step, e.g., by metering about 10 to 50 volume percent of anhydrous ammonia into the combustible propane-oxygen mixture conventionally used to accomplish surface treatment.

Of course, the optimum concentration of nitrogen compound to be added depends somewhat on the nature of the compound itself, the treating conditions employed as well as the plastic being treated, but can be determined from case to case by routine preliminary trials. A flow sheet drawing of the process is depicted in FIG. 1.

The nature, scope and operation of the present invention are further illustrated by the following examples, wherein the equipment and procedure used for producing the desired explosion treatment were substantially as described in U.S. Patent No. 2,952,560 and as particularly illustrated in FIGURE 3 thereof.

*Example 1*

A 4 oz. blow-molded bottle of polyethylene (density 0.92) was filled with a combustible mixture containing 1 part by volume of propane and 3 parts by volume of air, the mixture was exploded by a high voltage spark and the bottle flushed immediately with anhydrous ammonia gas. The heated bottle was then cut open and the interior surface was rubbed ten times with a paper towel. The initial charge, as measured by a Keithley Electrometer, was only 0.5 kv. and within 5 minutes decayed to 0. Under the same conditions an untreated control sample had 12 kv. of initial charge.

*Example 2*

One drop (about 0.05 ml.) of concentrated aqueous ammonia was introduced in the same kind of polyethylene bottle as described in Example 1, the bottle was then promptly filled with the combustible propane/air mixture and the mixture was exploded, also as in Example 1. In a control test one drop of distilled water was used instead of aqueous ammonia, otherwise following exactly the same procedure as just described. Upon treatment, each of the bottles was again cut open and the inner surface rubbed ten times with a paper towel and the initial charge measured. The bottle subjected to the explosion treatment in the presence of ammonia was again found to carry an initial charge of only 0.5 kv.,
which decayed rapidly, whereas the control sample had an initial charge of 7.5 kv.

The scope of the present invention is particularly pointed out in the appended claims.

What is claimed is:

1. Process for treating a relatively non-polar synthetic vinyl plastic to improve its surface properties which comprises oxidizing the surface of said plastic and reacting said surface with a nitrogen compound selected from the group consisting of ammonia, hydrazine, amines having the formula

and hydrazines having the formula

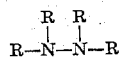

the R's in the formulas representing alkyl radicals containing from 1 to 8 carbon atoms.

2. A process for treating the surface of a plastic polyolefin article to improve its adhesive and antistatic properties which comprises oxidizing said surface and reacting the oxidized surface with a nitrogen compound selected from the group consisting of ammonia, hydrazine, amines having the formula

and hydrazines having the formula

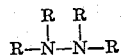

the R's in the formulas representing alkyl radicals containing from 1 to 8 carbon atoms.

3. A process according to claim 2 wherein the oxidative treatment involves applying a gas flame to said surface.

4. A process according to claim 2 wherein said oxidative treatment involves igniting a combustible mixture of a hydrocarbon gas and an oxygen-containing gas next to the polyolefin surface to be treated.

5. A process according to claim 4 wherein the combustible mixture contains about 10 to 50 percent $NH_3$.

6. A process according to claim 2 wherein said nitrogen compound is hydrazine.

7. A process according to claim 2 wherein said nitrogen compound is n-butyl amine.

8. A process according to claim 2 wherein said oxidative treatment involves exposing said polyolefin surface to a high voltage corona discharge in the presence of an oxygen-containing atmosphere.

9. A process for treating the surface of a polyethylene article to improve its antistatic properties which comprises exposing said surface in the presence of ammonia to a reducing flame resulting from the combustion of a hydrocarbon fuel and an oxygen-containing gas.

10. A process for treating the surface of a polyethylene article to improve its antistatic properties which comprises exploding a combustible mixture containing a hydrocarbon gas, air and ammonia next to the surface to be treated.

References Cited by the Examiner

UNITED STATES PATENTS

| | | |
|---|---|---|
| 2,570,094 | 10/1951 | Bradley. |
| 2,805,173 | 9/1957 | Ambler. |
| 2,913,448 | 11/1959 | Tabler _____ 117—118 XR |
| 2,952,560 | 9/1960 | Wilkalis. |
| 2,998,324 | 8/1961 | Hirt. |

MURRAY KATZ, *Primary Examiner.*